(No Model.) 2 Sheets—Sheet 1.

C. H. HOPWOOD.
CORN PLANTER.

No. 538,915. Patented May 7, 1895.

Attest:
F. H. Schott
M. C. Massie

Inventor
Charles H. Hopwood
by
White & Kleiner
his attys.

(No Model.) 2 Sheets—Sheet 2.

C. H. HOPWOOD.
CORN PLANTER.

No. 538,915. Patented May 7, 1895.

Attest:
F. H. Schott
M. C. Massie

Inventor:
Charles H. Hopwood
by White and Kleiner
his attys.

UNITED STATES PATENT OFFICE.

CHARLES H. HOPWOOD, OF FLANAGAN, ILLINOIS.

CORN-PLANTER.

SPECIFICATION forming part of Letters Patent No. 538,915, dated May 7, 1895.

Application filed October 29, 1894. Serial No. 527,291. (No model.)

*To all whom it may concern:*

Be it known that I, CHARLES H. HOPWOOD, a citizen of the United States, residing at Flanagan, in the county of Livingston and State of Illinois, have invented certain new and useful Improvements in Corn-Planters; and I do hereby declare the following to be a full, clear, and exact description of the invention, such as will enable others skilled in the art to which it appertains to make and use the same.

My invention relates to an improvement in corn planters.

The object of my invention is to provide a new and improved dropping device, which will be positive in action and readily regulated by the driver of the planter.

The invention consists in the features, details of construction and combinations of parts which will first be described in connection with the accompanying drawings and then particularly pointed out in the claims.

Figure 1:
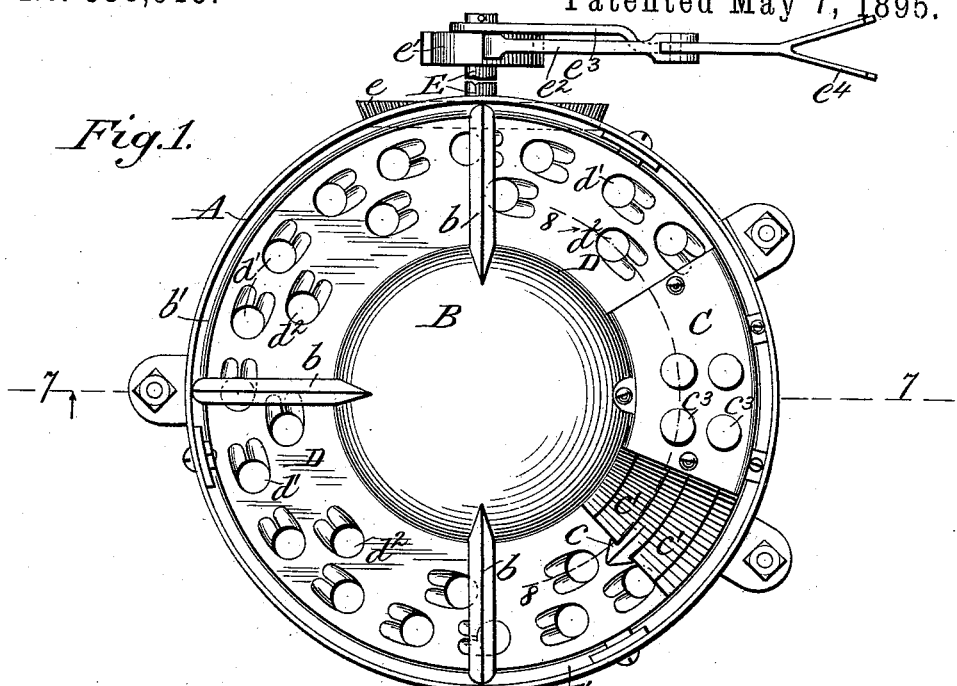
Figure 3:
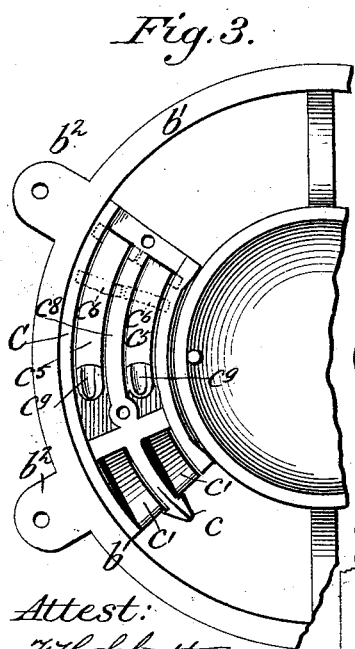
Figure 2:
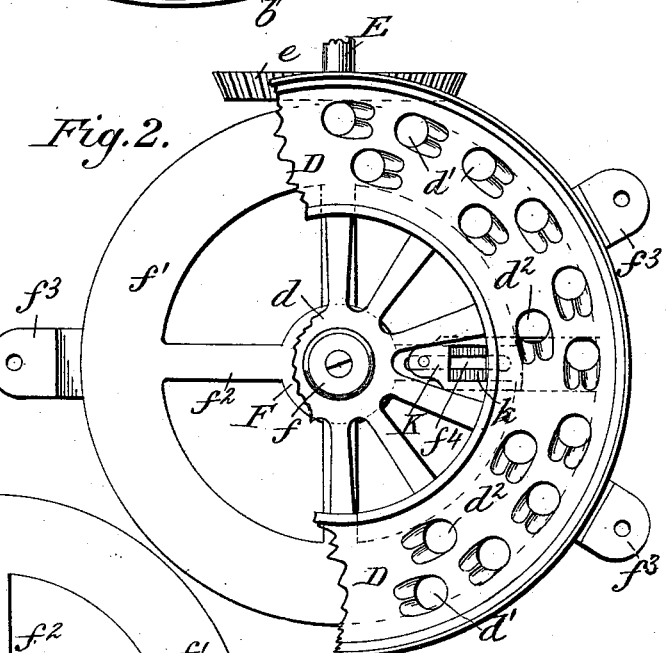
Figures 4, 5:
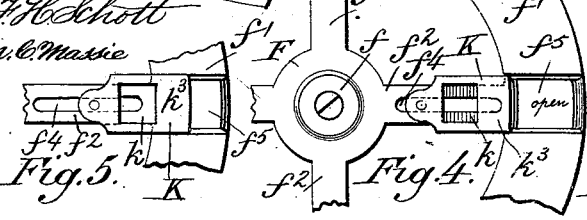
Figure 6:
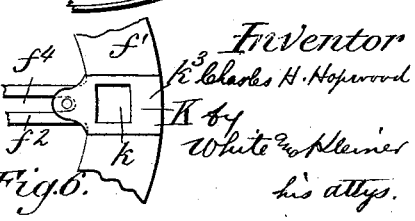
Figure 7:
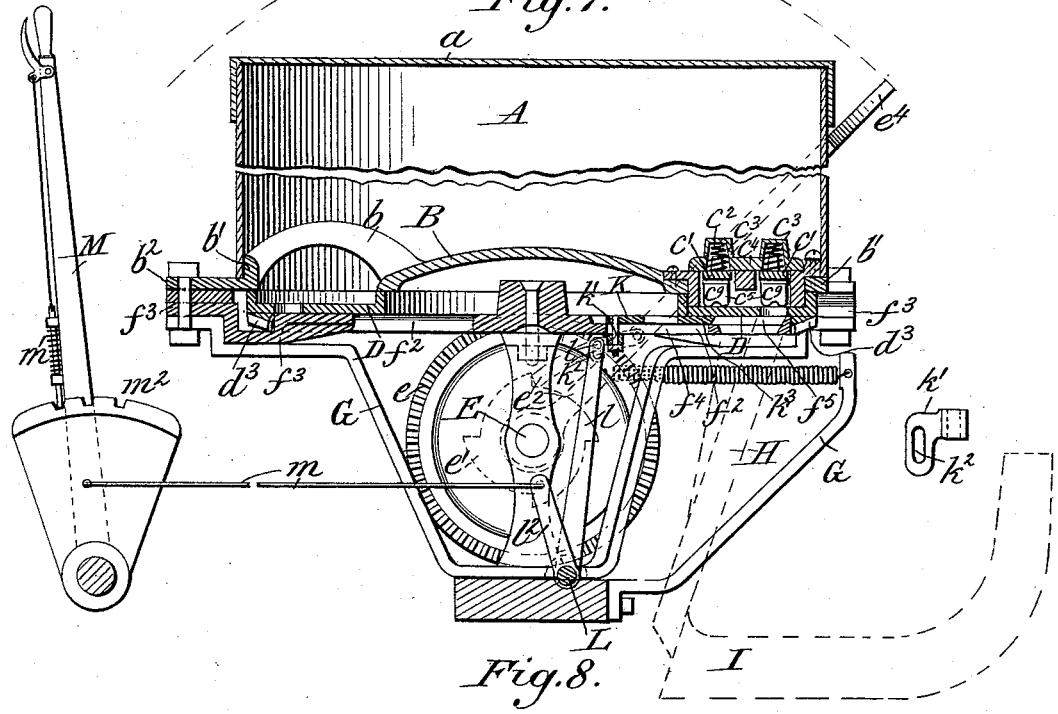
Figure 8:
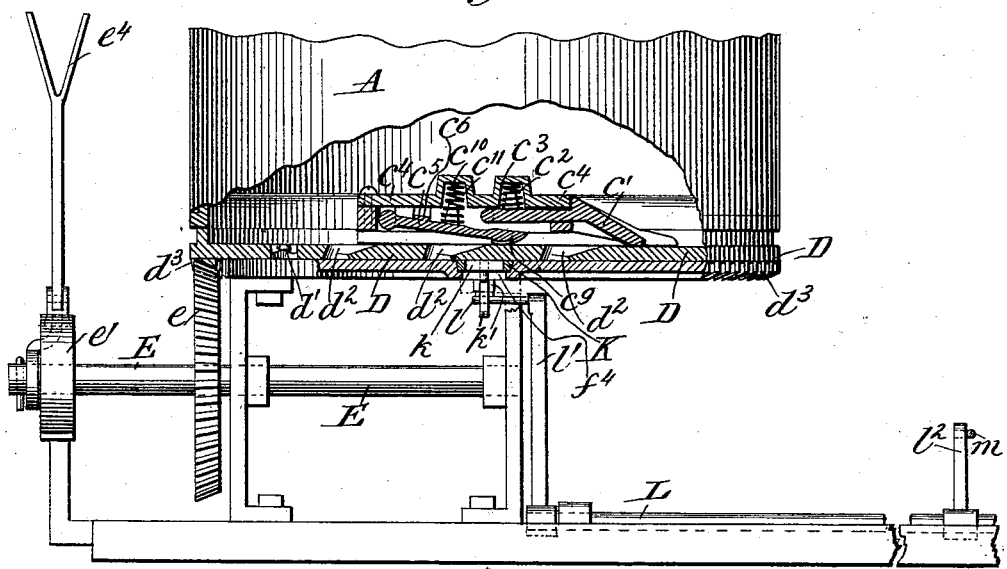
Figure 9:
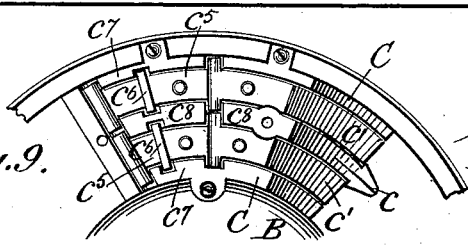

In the drawings, Figure 1 is a plan view of a seed hopper and dropping mechanism embodying my invention. Fig. 2 is a detail plan view, partly broken away, of a seed-dropping plate and base-piece. Fig. 3 is a detail plan view showing the cut-off box and cut-offs. Fig. 4 is a detail plan view of the slide in its open position. Fig. 5 is a similar view of the same in another position. Fig. 6 is a similar view of the same in still another position. Fig. 7 is a transverse vertical sectional view of the seed hopper and dropping mechanism. Fig. 8 is a detail sectional elevation, partly in section, on the line 8 8, Fig. 1. Fig. 9 is a plan view of the cut-offs and knockers.

Referring to the drawings, A is a seed hopper or box, provided with a lid, $a$, and an open bottom having a centrally-arranged cover disk, B, whose arms, $b$, are preferably formed integral with a ring, $b'$, bolted to the hopper, A. Between the spider, B, and the ring, $b'$ at one side, is located a cut-off box, C, segmental in shape, as shown, and provided with a projecting arrow-shaped nose, $c$, at each side of which is placed a cut-off, $c'$, each cut-off being pivoted or hinged to and within the cut-off box, C, and held down by a spiral spring, $c^2$, located in sockets, $c^3$, which are preferably formed integral with a lid, $c^4$, attached to the cut-off box. Behind the cut-offs are arranged two knockers, $c^5$, which are pivoted or hinged in the cut-off box and are provided each with a lug or cross arm, $c^6$, which has its ends movable in recesses in the sides, $c^7$ and central rib, $c^8$, of the cut-off box, as will be plain from Fig. 9. The knockers are each provided with grooved downward-projecting beveled ends, $c^9$, for a purpose hereinafter described, and are pressed downward by spiral springs, $c^{10}$, located in sockets, $c^{11}$, preferably formed integral with the lid, $c^4$.

Within the hopper is located a revoluble seed-dropping disk or plate, D, preferably provided with a skeleton center, $d$, and having a plurality of concentrically-arranged circular rows of seed cups arranged in groups. In the plate illustrated in the drawings, only two rows, $d'$, and $d^2$, are shown, the seed cups being grouped in threes, consisting of two cups in the outer row and one cup in the inner row, although it is apparent, that, if desired, a greater number of concentric rows may be employed, or the seed-cups may be arranged in groups having more than three. The plate, D, is provided, on the under side, with a downward-extending crown-gear, $d^3$, which engages a bevel pinion, $e$, fixed on an operating shaft, E, journaled on the frame-work of the machine and actuated by a ratchet wheel, $e'$, engaged by a spring-held pawl, $e^2$, pivoted to a lever, $e^3$ having a forked end, $e^4$ between the tines of which passes the check-row wire in the usual way, so that, as the machine is driven across a field, the operating shaft, E, will be intermittently operated by the buttons on the check-row wire, as will be fully understood by those skilled in the art, thus imparting an intermittent rotary motion to shaft, E, and the plate, D. This plate, D, is journaled on a stud, $f$, projecting upward from a base-piece, F, having an annular surface, $f'$, radial arms, $f^2$ and outward-extending lugs, $f^3$, which are secured to similar lugs, $b^2$, on the ring, $b'$, and to standards, G, secured to the frame of the machine.

One of the radial arms, $f^2$, of the base piece, F, is slotted, as at $f^4$, and the annular portion, $f'$ is provided with a seed-dropping opening, $f^5$, in communication with the seed pipe, H, which conducts the seed to the rear of the shoe, I, in the usual way. The annular portion of the base-piece is recessed around the seed-dropping, opening, as shown in Fig. 4, to receive a slide, K, provided with an opening, $k$, and arranged to have its top surface flush with the top of the annular portion, $f'$, which is in contact with the bottom surface of the plate, D, thereby preventing the grain from falling through the seed-cups except at the seed-dropping opening and only there when the said cups and opening are in register.

The slide, K, is arranged to be moved inward toward the center of the base piece, or outward, as desired, by the driver, through the intervention of any suitable mechanism. In the drawings, I have shown the slide provided with a downward-projecting lug, $k'$, which extends through the slot, $f^4$, in one of the radial arms, $f^2$, and is provided, itself with a slot, $k^2$, in which enters a cranked end, $l$, of a crank-arm, $l'$, fixed to a rock shaft, L, journaled on the frame of the machine and arranged to be operated by a lever, M, connected by a rod, $m$, to a crank-arm, $l^2$, near the center of the rock shaft, L, said lever having a spring-pawl, $m'$, adapted to engage a notched segment, $m^2$, whereby the lever and the rock shaft may be thrown into and retained in three positions, thus moving the slide, K, and holding it in any one of three positions, viz: first, with its outer solid end, $k^3$ beneath the outer row of seed-cups, the opening, $k$, being then below the inner row; second, with the outer solid end, $k^3$ beneath the inner row of seed-cups, and, third, entirely within the annular portion of the base-piece. In the first of these three positions, the grain can not drop through the holes of the outer row, but can fall through the holes of the inner row, and, hence, if the intermittent rotation of the seed-plate be uniform, the seed will fall in single grains at equal intervals of time. In the second position, the seed will fall only through the holes in the outer row, and, as these holes are in groups of two, the said seed will fall two grains at the same time, or nearly at the same time, while no seed can fall through the holes of the inner row. In the third position, the seed falls through the holes of both the inner and outer rows in groups of three grains at about the same time. In this way, the machine can be operated to plant the corn in single grains at regular intervals, as in drilling, or two grains in a hill, or three grains in a hill. The advantage of this is that, if the fertility of the land being planted varies, the driver can vary the number of grains of seed to a hill without stopping the machine, by simply moving the hand lever, M, into any one of its three positions.

The cut-offs, $c'$, referred to above, being spring-actuated, will not crush or crack the corn, as they would if fixed, and, furthermore, in case of gravel or small stones getting into the holes in the disk, the cut offs will rise up and let the said stones or gravel pass, thereby saving all danger of breaking the ends of the cut-offs.

The knockers, $c^5$ as before mentioned, are provided with downward-projecting ends, $c^9$, which are held in close contact with the top surface of the seed-dropping plate, D, until one of the seed-cups comes in register with the seed-dropping opening, whereupon the respective knockers will strike the grain, and, on account of being forced downward by the spiral springs, $c^{10}$, will force the grain out. The object of employing the knockers is to insure that the grain will not stick in the cups and fail to fall into the seed-pipe.

It is to be understood that, while I have described one form of check-row mechanism for imparting an intermittent rotary motion to the seed-dropping plate, any suitable means for performing such function may be employed, and, if desired, the plate may be continuously instead of intermittently rotated.

Having thus fully described my invention, what I claim as new, and desire to secure by Letters Patent, is—

1. In a planter, the combination, with a rotatable seed-dropping plate having a plurality of rows of seed cups, of a slide provided with an opening and movable beneath the seed cups, whereby either or both rows of seed cups may be shut off from communication with the seed pipe, substantially as set forth.

2. In a planter, the combination, with a rotatable seed-dropping plate having a plurality of rows of seed cups arranged in groups, of a slide provided with an opening and movable beneath the said seed cups, whereby certain of the seed cups of a group may be shut off from communication with the seed pipe, while others of the group are left open, substantially as set forth.

3. In a planter, the combination, with a base piece having a seed-dropping opening, a recess around the opening, and a radial slot, of a rotatable seed-dropping plate having a plurality of rows of seed cups, and a slide provided with an opening and movable over the seed-dropping opening, said slide being provided with a lug projecting through the radial slot, and located in the recess with its upper surface flush with the upper surface of the base piece, substantially as set forth.

4. In a planter, the combination, with a rotatable seed dropping plate having a plurality of concentric rows of seed cups, of a slide having an opening, and mechanism for moving the slide so as to bring the opening below any row of cups, substantially as set forth.

5. In a planter, the combination, with a rotatable seed-dropping plate having a plurality of concentric rows of seed cups, said seed cups being arranged in groups, of a slide provided with an opening and radially movable beneath the said cups, and mechanism for moving the slide so as to open or close the outlet from any desired row of seed-cups, substantially as set forth.

In testimony whereof I affix my signature in presence of two witnesses.

CHARLES H. HOPWOOD.

Witnesses:
M. C. MASSIE,
A. J. BIRNEY.